Figure 1:
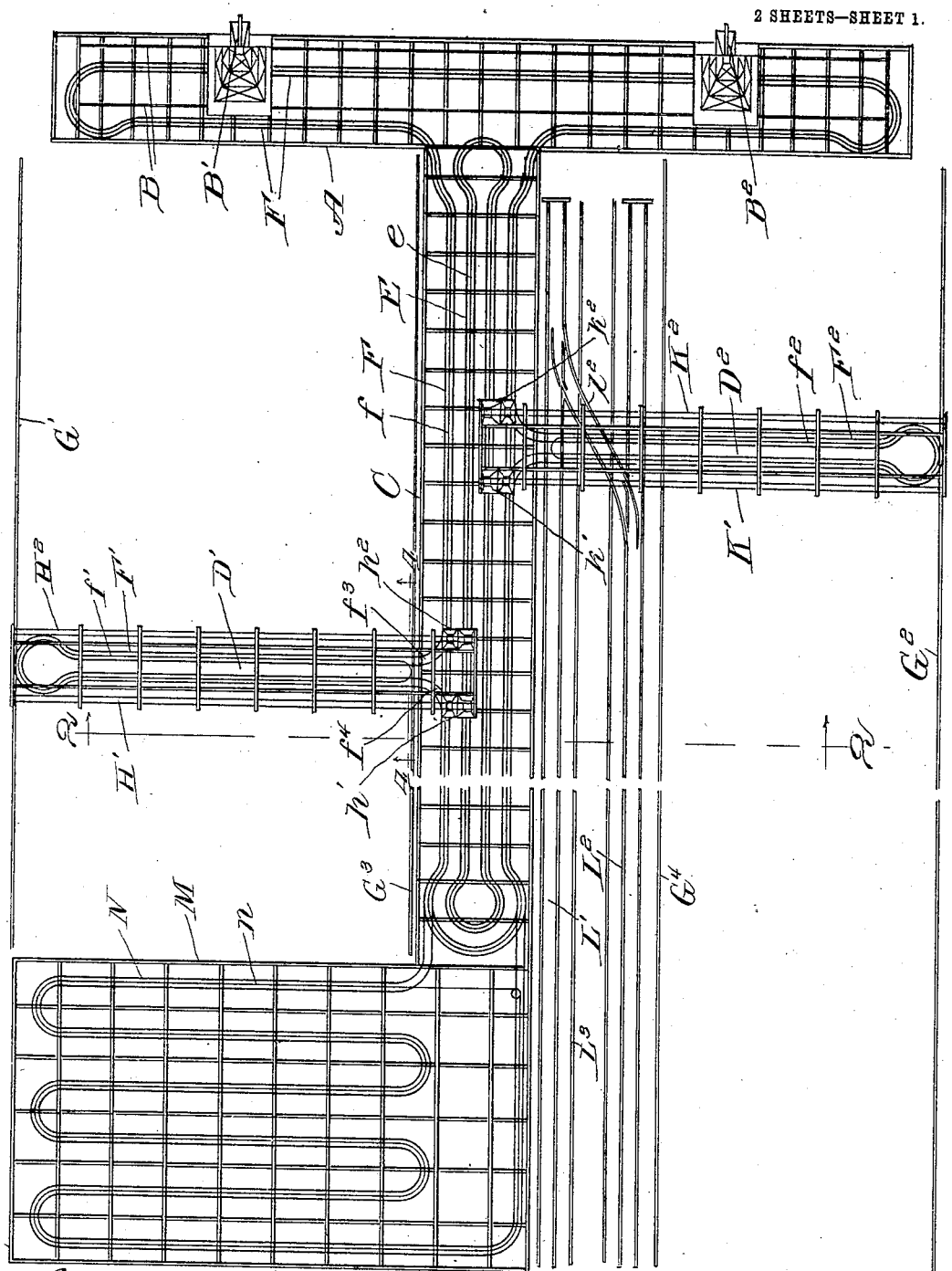

No. 835,563. PATENTED NOV. 13, 1906.
W. J. SELLECK.
APPARATUS FOR STORING MATERIAL.
APPLICATION FILED NOV. 7, 1905.

2 SHEETS—SHEET 1.

Witnesses
H. S. Gaither
C. A. Mullen

Inventor:
William J. Selleck
by Chamberlin & Wilkinson
Attys

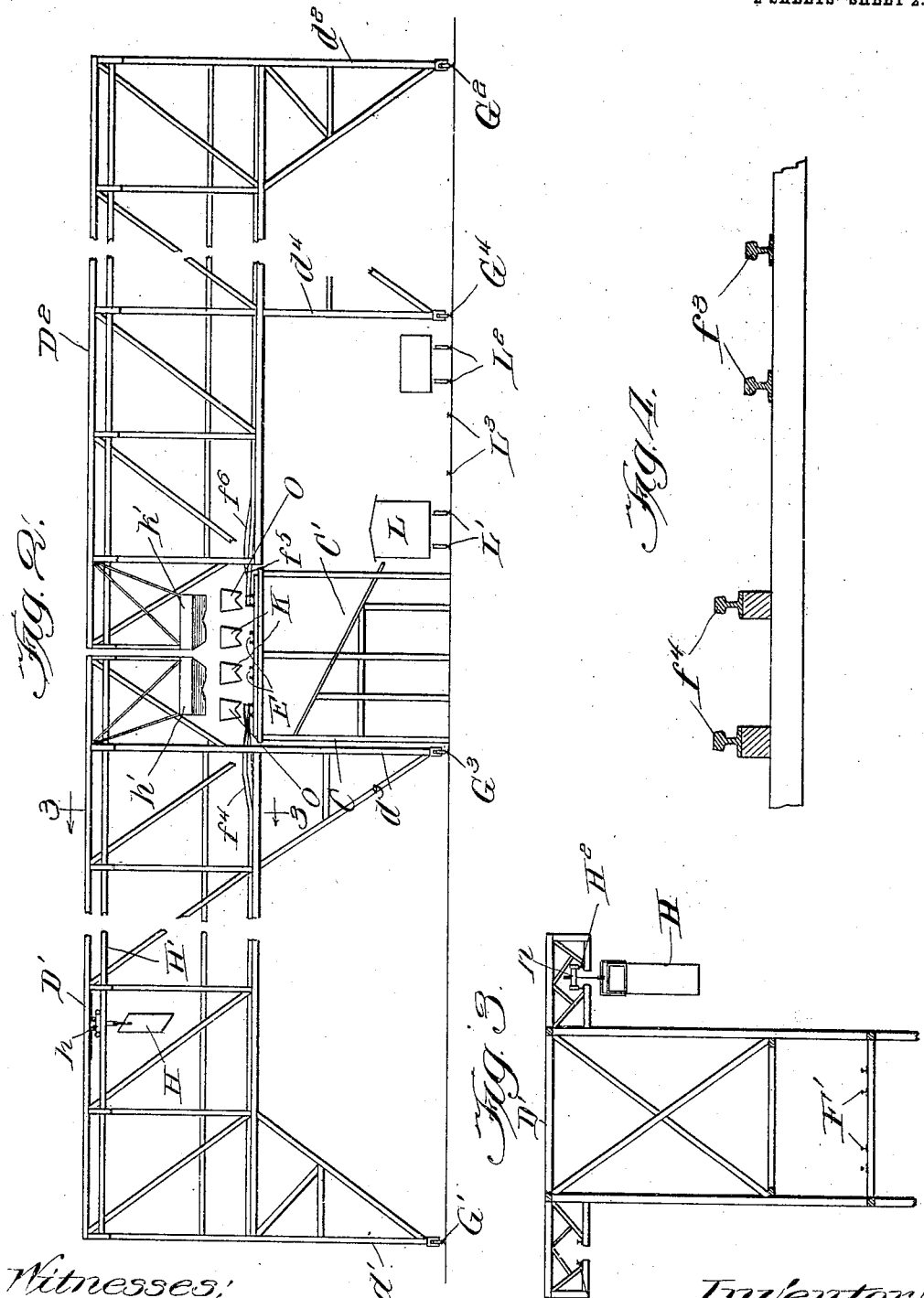

UNITED STATES PATENT OFFICE.

WILLIAM J. SELLECK, OF RIVERSIDE, CONNECTICUT.

APPARATUS FOR STORING MATERIAL.

No. 835,563.     Specification of Letters Patent.     Patented Nov. 13, 1906.

Application filed November 7, 1905. Serial No. 286,281.

*To all whom it may concern:*

Be it known that I, WILLIAM J. SELLECK, a citizen of the United States, residing at Riverside, county of Fairfield, State of Connecticut, have invented a certain new and useful Improvement in Apparatus for Storing Material; and I declare the following to be a full, clear, and exact description of the invention, such as will enable others skilled in the art to which it pertains to make and use the same, reference being had to the accompanying drawings, which form a part of this specification.

My invention relates in general to apparatus for unloading, storing, and reloading coal or other material.

At points where coal is unloaded, particularly from vessels, it is desirable that facilities should be provided either for storing the coal in pockets preparatory to reshipment or for storing it throughout a storage area from which it may be removed and reloaded upon cars as occasion may require.

The primary object of my invention is to provide an apparatus for unloading coal or other material from any one of several points or simultaneously from a plurality of points—as, for instance, from the hatches of a vessel—and transferring the coal either to any one of a series of pockets or to any desired point in a storage area from which it may be subsequently removed and reshipped.

A further object of my invention is to provide in a plan for storing and handling coal or other material an apparatus for depositing the coal at any point in a storage area or simultaneously at two different points in the storage area and apparatus for removing the coal from one point or simultaneously from two different points in the storage area, the plant being so arranged that, if desired, the coal may be deposited at one point on the storage area at the same time it is being removed for shipment from another point in the storage space.

A still further object of my invention is to provide an apparatus of the character referred to which will be comparatively simple in construction, practicable in operation, and which will enable the coal or other material to be expeditiously and economically handled.

My invention, generally described, comprises unloading mechanism, such, for instance, as towers movably supported upon a dock structure, an elevated stationary structure extending over a storage area and having pockets therein for loading cars, a continuous loop-track supported upon the elevated structure and extending adjacent the unloading towers, movable cranes projecting at right angles to the stationary structure and extending from each side thereof over the storage area, loop-tracks supported upon the cranes connected by switch points with the loop-track on the elevated structure, tracks upon the cranes extending at their ends over the pockets in the elevated structure, pick-up mechanism traveling upon said tracks, and an endless loop-track upon the elevated structure extending beneath hoppers supported at the ends of the pick-up tracks on the cranes.

My invention will be more fully described hereinafter with reference to the accompanying drawings, in which the same is illustrated as embodied in a convenient and practical form, and in which—

Figure 1 is a plan view; Fig. 2, an enlarged sectional view on line 2 2, Fig. 1; Fig. 3, an enlarged sectional view on line 3 3, Fig. 2; and Fig. 4 an enlarged sectional view on line 4 4, Fig. 1.

The same reference characters are used to designate the same parts in the several figures of the drawings.

Reference character A indicates a structure located adjacent points where coal or other material is to be unloaded—as, for instance, along a wharf or dock.

B' and B² indicate unloading-towers of any ordinary construction by means of which the coal may be removed through the hatches of vessels at the dock.

C indicates a stationary elevated structure extending at an angle from the dock structure A. The structure C extends above a storage area, portions of such area being on each side of the structure. Reloading-pockets, such as indicated at C' in Fig. 2, are provided in the elevated structure C.

F indicates a continuous-loop track supported upon the structure C and extending along the dock structure A beneath the unloading-towers thereon. Any suitable means may be provided for propelling cars along the loop-track F—such, for instance, as a cable *f*. Located within the loop of the track F upon the elevated structure is a second endless track E, upon which cars may be propelled by any suitable means—such, for instance, as a cable *e*. The track E and the portion of the track F upon the structure C are located above the pockets C', so that coal may be dumped from cars supported upon such tracks into the pockets.

D' and D² indicate traveling cranes or bridges located on the opposite sides of the elevated structure C and adapted to be moved over the storage spaces beneath the same. The crane D' is provided with a loop-track F' thereon, connected by switch-points with the adjacent rails of the track F. Any suitable means may be provided for propelling the cars along the track upon the crane D'—such, for instance, as cable $f'$. The crane D' is provided with parallel tracks H' and H², supported at each side of the top thereof, upon which pick-up buckets, such as shown at H, are supported.

$h$ indicates a trolley for supporting the pick-up bucket, which engages the rails of the track H², similar pick-up buckets and supporting-trolleys being provided for the track H'.

The end of the crane D' projects at the top thereof over the adjacent portion of the structure C, so that hoppers $h'$ and $h^2$ may be supported beneath the ends of the pick-up tracks H' and H², as shown in Figs. 1 and 2. The hoppers are located above the adjacent side of the loop-track E, so that coal deposited by the pick-ups in the hoppers is directed to cars upon such track or upon track F or into the pocket C'.

The crane D' is supported at its outer end by means of a truss structure $d'$, having wheels thereunder engaging a track G'. The crane D' is supported adjacent the structure C by posts $d^3$, having wheels on the lower ends thereof engaging a rail G³.

The crane D² is supported at its outer end by posts $d^2$, provided with wheels under the same engaging a track G². Other supporting-posts $d^4$ are provided beneath the crane D² and have wheels under the same resting upon a track G⁴. The posts $d^4$ are spaced a distance away from the structure C, so as to permit cars to be loaded with coal from the pockets C' to pass between the same and the central structure C.

A loop-track F² is supported upon the crane D² and is connected by switch-points with the adjacent rails of the track F.

$f^2$ indicates a cable for propelling the cars along the crane D² upon the track F².

The crane D² is also provided with parallel tracks K' and K², similar to the tracks H' and H² on the crane D', upon which pick-up buckets travel. Hoppers $k'\ k^2$ depend from the inner end of the top of the crane D², which overhangs the structure C, such hoppers being located beneath the ends of the pick-up tracks K' and K² and being adapted to direct coal into cars upon the adjacent rails of the loop-track E or of the track F or into pocket C'.

In order that the cars may readily pass from the track F to the track F' upon the crane D', the portions of the rails $f^3$ of the track adjacent the switch-points are slightly lower than the plane of the track F, so that the cars when disconnected from the cable $f$ will pass over the switch-points and pick up the cable $f'$, while cars which are about to leave the track F' to return to the loop-track E are drawn by the cable $f'$ upon elevated portions $f^4$ of the rails adjacent the switch-points, so that when the cable $f'$ is released the cars will continue over the switch-points to the track F and pick up the cable $f$. A similar arrangement of the portions of the rails of the track F² adjacent the switch-points on the crane D² is provided, as indicated in Fig. 2, in which the portions $f^5$ of the rails leading from the switch-points on the track F to the track F² slightly decline after leaving the track F, while the switch-points slightly decline toward the track F, owing to the adjacent portion $f^6$ of the track F² being slightly elevated.

L' indicates a track for supporting cars L adjacent the pockets C', while L² indicates a parallel track upon which empty cars pass to the track L' by means of the switch-points and connecting-track $l^2$.

M indicates a storage-building for hard coal or other material which it is desired to keep separate from the material deposited upon the storage area. A track N is supported above the pockets in the storage-house M, which is connected by suitable switch-points with the loop-track F. Any suitable means—such, for instance, as cable $n$—may be provided for propelling the cars along the track N.

The manner of using and operation of my improved apparatus are as follows: The unloading-towers B' and B² may be moved along their supporting-tracks B upon the dock structure A opposite hatches in vessels and the coal then unloaded and deposited in cars passing along the endless loop-track F beneath the towers. The cars are drawn along the track F above the pockets C', so that the coal may be dumped from the cars directly in such pockets when it is desired to reload the coal upon cars. The cars may pass from the track F upon the track F' of the crane D' and be dumped at any point along the crane, the latter having been adjusted to the desired portion of the storage area. After the cars have dumped they continue around the track F' to the track F and return to the towers to receive other loads of coal. Instead of directing the loaded cars to the track F' upon the bridge D' they may continue upon the track F until the second bridge D² is reached and then directed by the switch-points to the track F² thereon and dumped at any desired point on such bridge, after which the empty cars return to the track F to receive other loads of material from the towers. When it is desired to remove the coal or other material from the storage area, the crane D' or D² is adjusted to a position above the coal, when the pick-up buckets are put into operation and remove the coal and carry the same along the tracks on the bridges to points above the hoppers. The hoppers receive the coal from the pick-up buckets and direct the same either into the pockets or into cars, such as K on the inner loop-track E or into cars O on track F, by which it is carried along the structure C to a point above the pocket in which it is desired to deposit the coal. The cars L are drawn along the tracks L² and L', so as to be opposite the pockets from which the coal is to be delivered for shipment.

L³ indicates rails intermediate of the tracks L² and L', upon which suitable apparatus (not shown) may be supported for trimming the coal within the cars.

The stationary structure C may be provided with a continuous pocket to receive the coal preparatory to reloading the same upon cars in lieu of providing a series of pockets.

If desired, the separate cables on the cranes may be dispensed with and the cable $f$ extended around the loop-tracks on the cranes, in which event it will of course be unnecessary to provide elevated and lowered portions of the tracks on the cranes adjacent the track F. It will of course be understood that other means for propelling the cars than a cable or cables may be provided, if desired.

From the foregoing description it will be observed that in my improved apparatus coal or other material may be simultaneously deposited at different points of a storage area or may be simultaneously removed from separate points of the storage area, or coal may be stored at one part of the area and simultaneously removed for shipment from another portion of the storage area.

Having now fully described my invention, what I claim as new, and desire to secure by Letters Patent, is—

1. The combination with a storage area, of an elevated structure extending above said area, a track supported upon said structure, separately-movable cranes extending over said storage area from the opposite sides of said structure, and a track supported upon said cranes connected with said stationary track.

2. The combination with a storage area, of an elevated structure extending above said area, a track supported upon said structure, pockets formed in said structure beneath said track, separately-movable cranes extending over said storage area from the opposite sides of said structure, and loop-tracks supported upon said cranes connected with said stationary track.

3. The combination with a storage area, of an elevated structure extending above said area, a track supported upon said structure, pockets formed in said structure beneath said track, separately-movable cranes extending over said storage area from the opposite sides of said structure, loop-tracks supported upon said cranes connected with said stationary track, and conveying apparatus carried by said cranes adapted to remove material from points in said storage area and deposit the same in said pockets, or in cars on said track.

4. The combination with a storage area, of an elevated structure extending above said area, a track supported upon said structure, pockets formed in said structure beneath said track, separately-movable cranes extending over said area from the opposite sides of said structure, loop-tracks supported upon said cranes connected with said track, an endless loop-track supported on said structure above said pockets, and conveying apparatus carried by said cranes adapted to remove material from points in said storage area and deposit the same in said pockets or in cars supported upon said endless track.

5. The combination with a storage area, of an elevated structure extending above said area, unloading mechanism adjacent said area, a supporting structure upon which said mechanism is movably mounted, a stationary loop-track supported upon said structures and extending adjacent said unloading mechanism, a movable crane extending over said area from one side of said elevated structure, and tracks supported upon said crane connecting with said loop-track.

6. The combination with a storage area, of an elevated structure extending above said area, unloading mechanism adjacent said area, a supporting structure upon which said mechanism is movably mounted, a stationary loop-track supported upon said structures and extending adjacent said unloading mechanism, two movable cranes extending over said area from each side of said elevated structure, and loop-tracks supported upon said cranes connected with said stationary loop-track.

7. The combination with a storage area, of an elevated structure extending above said area, unloading mechanism adjacent said area, a supporting structure upon which said mechanism is movably mounted, a stationary loop-track supported upon said structures and extending adjacent said unloading mechanism, pockets formed in said elevated structure beneath said track, a movable crane extending over said area from one side of said elevated structure, and tracks supported upon said crane connected with said loop-track.

8. The combination with a storage area, of an elevated structure extending above said area, unloading mechanism adjacent said area, a supporting structure upon which said mechanism is movably mounted, a stationary loop-track supported upon said structures and extending adjacent said unloading mechanism, pockets formed in said elevated structure beneath said track, a movable crane extending over said area from one side of said elevated structure, tracks supported upon said crane connected with said loop-track, and conveying apparatus carried by said crane adapted to remove material from points in said storage area and deposit the same in said pockets.

9. The combination with a storage area, of an elevated structure extending above said area, unloading mechanism adjacent said area, a supporting structure upon which said mechanism is movably mounted, a stationary loop-track supported upon said structures and extending adjacent said unloading mechanism, pockets formed in said elevated structure, a movable crane extending over said area from one side of said elevated structure, a loop-track supported upon said crane connected with said stationary loop-track, an endless loop-track supported on said elevated structure above said pockets, and conveying apparatus carried by said crane adapted to remove material from points in said storage area and deposit the same in said pockets or in cars upon said endless loop-track.

In testimony whereof I sign this specification in the presence of two witnesses.

WILLIAM J. SELLECK.

Witnesses:
GEO. L. WILKENSON,
HATTIE B. LEHMAN.